July 8, 1952  G. W. TIBBETS  2,602,476
LOG FITTING MACHINE

Filed Aug. 17, 1948  5 Sheets-Sheet 1

Fig. 12.

Inventor

George W. Tibbets

By Clarence A. O'Brien
and Harvey B. Jacobson
Attorneys

July 8, 1952 G. W. TIBBETS 2,602,476
LOG FITTING MACHINE
Filed Aug. 17, 1948 5 Sheets-Sheet 3

Inventor
George W. Tibbets
By Clarence A. O'Brien
and Harvey B. Jacobson
Attorneys July 8, 1952 G. W. TIBBETS 2,602,476
LOG FITTING MACHINE
Filed Aug. 17, 1948 5 Sheets-Sheet 4

Inventor
George W. Tibbets

By Clarence A. O'Brien
and Harvey B. Jacobson
Attorneys

July 8, 1952 G. W. TIBBETS 2,602,476
LOG FITTING MACHINE
Filed Aug. 17, 1948 5 Sheets-Sheet 5

Inventor
George W. Tibbets

By Clarence A. O'Brien
and Harvey B. Jacobson
Attorneys

Patented July 8, 1952

2,602,476

UNITED STATES PATENT OFFICE 2,602,476

LOG FITTING MACHINE

George W. Tibbets, West Yellowstone, Mont.

Application August 17, 1948, Serial No. 44,678

4 Claims. (Cl. 144—134)

This invention relates to novel and useful improvements in an apparatus for treating logs or other wooden stock in such a manner that the logs may be used for building cabins, houses, buildings and the like.

An object of this invention is to perform cutting operations on logs, the said cutting operations including cutting holes in a log, cutting a log at a preselected length, cutting longitudinal fastening tongues and grooves in the same log and cutting and fastening elements such as tongues and grooves on this log.

Another object of this invention is to provide improved means for carrying out the above-mentioned function which is mounted on a carriage, having all of the elements necessary for the cutting operations compact on this carriage and the elements being independent of outside power.

Another object of this invention is to provide a cutting apparatus capable of performing the above-mentioned function which includes an improved stand for supporting the log to be treated or processed, the said stand including adjustable members for retaining the logs at a preselected elevation and means for maintaining logs which would ordinarily be too short for effective cutting operations, in a manner so that they may also be treated.

Another object of this invention is to movably mount a carriage on a stand, which carriage supports a prime mover and a transmission, the transmission preferably being of the belt type in order to conduct torque to the cutting means of various descriptions whereby complete cutting operations may be effected on a single log.

Another object of this invention is to provide an efficient and practical device of this type which renders it unnecessary to use many independent tools for processing logs.

Ancillary objects and features of novelty will become apparent to those skilled in the art, in following the description of a preferred form of the invention, illustrated in the accompanying drawings, wherein:

In certain regions wherein timber is plentiful, it has been customary to build log cabins for use as domiciles, hunting lodges, resort houses, etc. Ordinarily there are required several tools or several distinct apparatus in order to cut all of the tongues, grooves and other fastening elements necessary for joining the logs into a single log cabin. Therefore, it is one of the prime purposes of the present invention to combine all of these tools so that they will operate on a single log, without the necessity of moving the stock successively from one tool to the next. Certain of the cutting operations on logs may be performed simultaneously, thereby further saving time.

The present invention consists of two main elements which are generally indicated at 10 and 12, respectively. The element 10 is a stand which supports logs while the element 12 includes a carriage and other pertinent mechanism for performing the cutting operations on logs or other suitable stock. It is obvious that the present invention is adapted primarily for cutting operations on logs, however, other wooden stock may be similarly processed, if it is found desirable.

The primary functions of the stand are to rollingly support the carriage and to maintain logs in a selected position of elevation from the ground in order that the cutters on the carriage may operate on the logs. The feature of adjustability is incorporated in the log supporting mechanism in order that they may be retained at angles of inclination in order to cut wedge-shaped slots, grooves, tongues, etc., and in order that the logs may be maintained at the proper distance from the cutters in the carriage 12.

Means is incorporated in the log supporting mechanism for the purpose of maintaining short logs in position for cutting operations. Ordinarily such short logs would have to be cut to size after the tongues and grooves or other similar fastening elements are formed therein. In the instant device all of the logs may be cut to a preselected size, if it is found desirable, and placed on the stand in order that the processing may take place and the logs transported directly from the site of log treatment to the building site.

The carriage, generally indicated at 12, has various devices for performing cutting operations on logs positioned or mounted thereon. These various devices are driven by a common prime mover 14, which is preferably an internal combustion engine. Of course, it is within the purview of the invention to utilize an electrically operative motor in lieu of the internal combustion, however, it is found that in regions wherein the class of device to which the present invention appertains is utilized, an internal combustion engine is more practical, since often there is an absence of electrical current available.

Belts and pulleys, as well as shafts, are supplied on the carriage 12 in order to transmit the torque from the engine 14 to the various cutters or cutting means. The said various cutting means includes a tool which may be raised and lowered for cutting holes, slots, etc., in the log supported by the stand 10. Another cutting means includes a device for cutting tongues and grooves selectively which is also rendered operative manually by an actuation lever which through the medium of various linkages rocks a rockers or rocker arm, which arm carries tongue and groove cutters at opposite ends thereof.

Means for cutting fastening elements in the ends of the logs is provided and is also manually operative, the cutting means in this instance being raised and lowered in a reciprocatory manner.

The final cutting means is a device which is resiliently mounted on the carriage and cuts the logs to size. An ordinary circular saw blade may be used in this connection, which is supported by a spring attached to the carriage as well as the various other framing members.

The device includes primarily the elements mentioned above as broadly stated. The carriage must be mounted on the stand for motion in order that the logs to be cut are maintained in the proper position relative to the cutting elements on the carriage. Accordingly, rails 18 and 20, respectively, are provided on blocks 22, 24 and 26, 28, respectively. The two groups of blocks 22, 24 and 26, 28 are parallel to each other in order that the small flanged wheels 30, connected by the axle 32, may be freely rollingly mounted thereon. Of course, the wheels and the axle form a portion of the said carriage 12 to be described elsewhere.

A pair of yokes, each of which includes converging side members 34 and 36, respectively, are provided. These yokes have extensions 38 and 40, respectively, of the said sides 34 and 36 which are maintained in spaced relation by means of a block 42 which is thermo-chemically joined to the extensions. At the diverging ends of the sides 34 and 36 there is formed a pair of bearings 44 and 46, respectively, in which there is attached a shaft 48.

Figures 4, 8, 9:
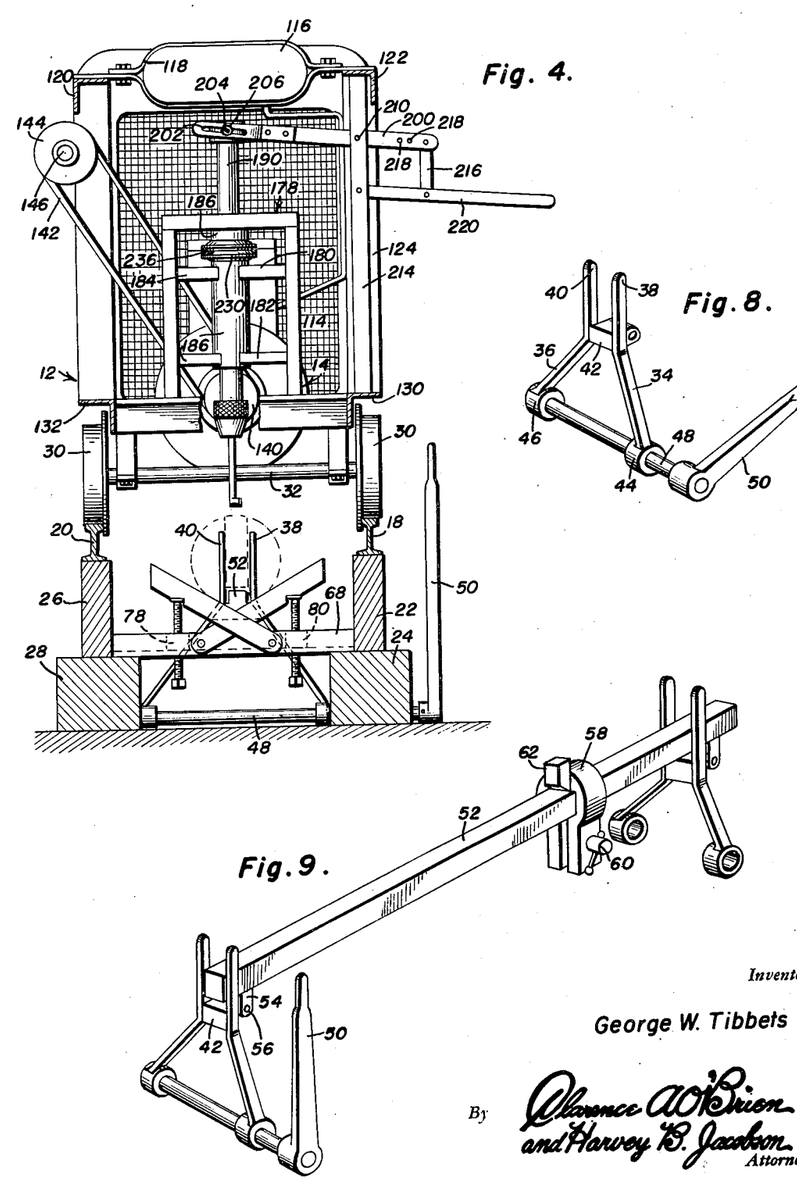
Figure 4 is a sectional view taken substantially on the line 4—4 of Figure 2 and in the direction of the arrows.
Figure 8 is a perspective view of one of the yokes used in log supporting.
Figure 9 is a perspective view of a bar used in conjunction with the yokes and the short logs which are to be maintained in position for cutting.

As is seen in Figure 4, the shaft 48 has one end journalled in the block 28 while the other end penetrates and extends through the block 24. This, of course, mounts the shaft 48 for rotation in the opposite or opposed blocks 24 and 28. A suitable handle 50 is attached to the free end of the shaft 48 in order that this shaft may be manually and easily rotated, thereby carrying with it the yoke.

As is seen in Figure 9, there are two yokes utilized in association with the stand 10. These yokes are identical in structure. A bar 52 is detachably mounted on the spacing blocks 42 of each yoke by means of depending ears 54 which flank each block 42 for reception of a pin 56 therein. Obviously, the bar 52 is then pivotally movable on the yokes upon rotation of the shaft 48. The utility of such a bar is to support a log after a groove has been cut therein. The groove will accommodate the particular cross section of the bar and maintain it firmly in position.

In order to cut logs which are of a size that will not ordinarily be maintained firmly, a stop is slidably mounted on the bar 52. This stop includes a substantially U-shaped element 58 having a screw, generally indicated at 60, extending through the substantially parallel ends thereof. Thus, a vice-like apparatus is effected. A substantially rectangular side 62 is attached to the bight of the U-shaped member 58 and is positioned directly over the bar 52. Thus, a substantially rectangular slide 62 is adapted to engage the end of a short log, thereby preventing it from sliding or slipping when certain cutting operations are being performed thereon. It will be noted at this point that the bar 52 and stop positioned thereon is used for short logs or stock which do not extend across the other log or stock supporting means to be detailed at this time. If it is found desirable, both the bar 52 and the stop mechanism thereon may be used simultaneously with the said other log supporting means, this being within the prerogative of the user of the device.

Figure 3:
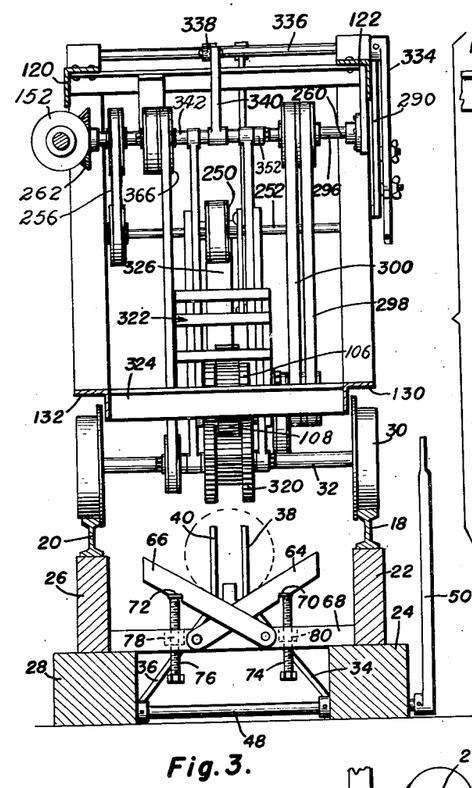
Figure 3 is a sectional view taken on the line 3—3 of Figure 2 and in the direction of the arrows.

Noting Figures 3 and 4, it will be seen that two substantially identical structures are provided between the pairs of parallel blocks. Each log supporting mechanism includes a pair of cross arms 64 and 66, respectively, which are pivoted to a cross bar 68. This cross bar rests on the bottom blocks 24 and 28 of the pairs of blocks and, if found desirable, may be firmly attached thereto. It is also within the purview of the invention to simply rest the cross bars 68 on the said bottom blocks 24 and 28 in order that they may be slidable to selected positions. Further, the present invention contemplates the use of detachable pins in these cross bars 68 whereby selected predetermined locations may be effected.

Smaller recesses 70 and 72, respectively, are provided in the cross arms 64 and 66 in order to accommodate and seat the terminals of screws 74 and 76, respectively. These screws are threadedly received in suitable bosses 78 and 80, respectively, which are attached to the cross members 68. By adjusting the screws 74 and 76 to a selected amount, the crossed arms may be moved relative to each other in order to raise and lower selectively a log or other piece of stock mounted thereon. This, of course, elevates the log to a position whereby the cutters in the carriage 12 may process the logs in whatever manner is desired by the operator of the invention, of course, within the capabilities of the apparatus.

Attention is now directed primarily to Figures 11–15 for a discussion of the product which is treated by the present apparatus. Inspection of the finished product will lead to a clearer understanding of the end attained by utility of the device.

Figures 11, 12:
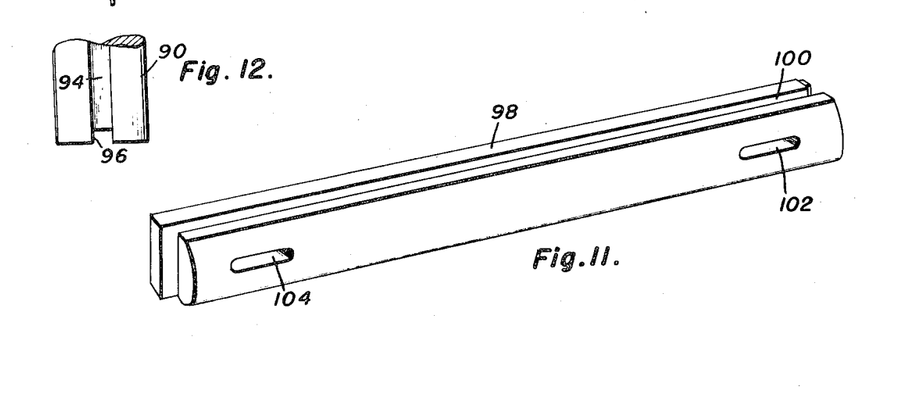
Figure 11 is a perspective view of a typical log after being processed by the instant device.
Figure 12 is a fragmentary elevational view showing a portion of the log with a groove cut therein by the instant device.
Figure 15:
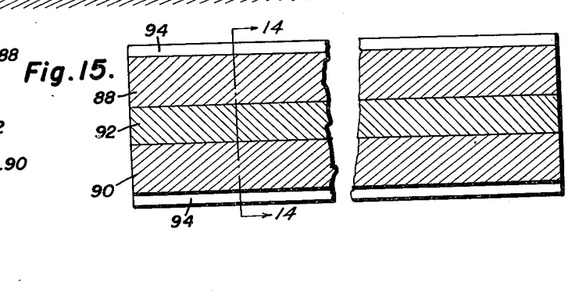
Figure 15 is a sectional view taken on the line 15—15 of Figure 14 and in the direction of the arrows.

In Figure 15 a log 88 and an identical log 90 are supplied in spaced relation relative to each other. A conventional spacing strip 92 is used for maintaining the logs in spaced relation relative to each other and used for sealing the logs to each other. This sealing strip 92 simply imbeds itself in the grooves 94 of the logs. These particular grooves 94 are longitudinally positioned or formed in the logs, this being a well known expedient for joining side logs of a cabin, house, etc. Figure 12 illustrates the log 90 and the groove 94 and shows an additional groove 96 extending across the end of the log 90. This groove 96 is formed by a separate cutting operation of the device and by separate means. However, it is within the capabilities of the machine to cut both the grooves 94 and 96 simultaneously by simple manipulation of two levers at the same time.

Noting Figure 11, this piece of stock or finished log 98 has been trimmed at both ends and has a longitudinal cut-out 100 at one portion thereof. Slots 102 and 104, respectively, are cut in the stock 98 by means of a separate tool or cutting element as well as other pertinent mechanism in the carriage 12. The said finished log 98 is a typical one utilized at certain places in building log cabins.

Of course, the illustration of Figure 15 shows the ends of the logs 88 and 90 cut smoothly and at substantially 90° relative to the longitudinal axis of the logs. Such cut is effected by means of a separate and independent cutting element provided on the carriage and actuated by the prime mover 14.

Figure 7:
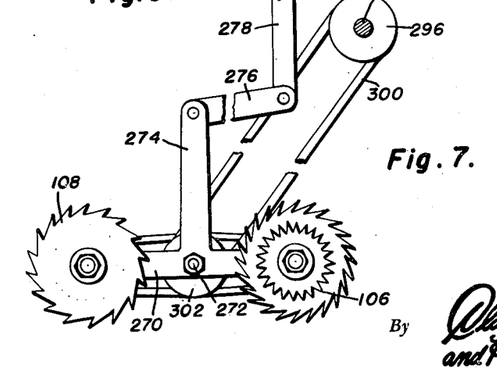
Figure 7 is a sectional view illustrating details of construction and taken on the line 7—7 of Figure 1 and in the direction of the arrows.
Figure 13:
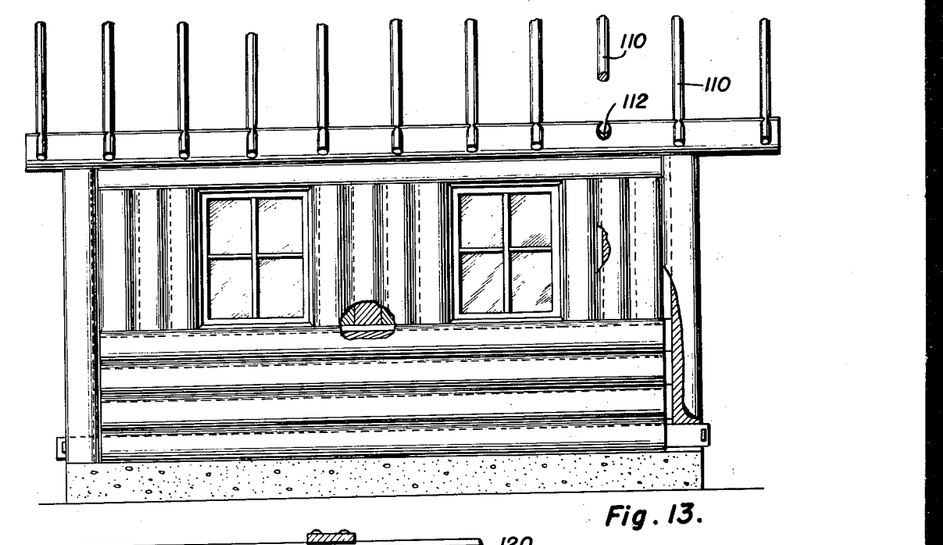
Figure 13 is an elevational pictorial view, portions being broken away in section showing a utility of the logs.
Figure 14:
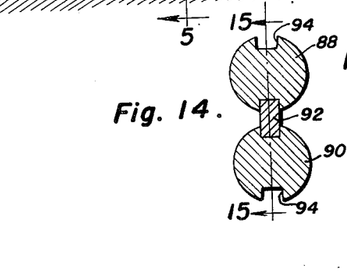
Figure 14 is a sectional view taken on the line 14—14 of Figure 15 and showing how the logs are joined.

Referring to various portions of the illustration of the portion of the cabin in Figure 13, it will be immediately obvious that certain of the logs have tongues formed thereon. This tongue is formed by the same or substantially the same mechanism (see Figure 7) which is utilized for cutting grooves of the longitudinal type and logs. The mechanism of Figure 7 is operative through the medium of a hand-actuated lever in order to selectively engage either of the cutters 106 or 108 with the log supported in the stand. One type of blade cuts grooves while the other type of blade cuts tongues.

Also, in Figure 13, it will be seen that the plurality of relatively small diameter roof elements 110 are shown. Thus, circular holes or apertures 112 must be provided in order to accommodate these elements 110. These holes are cut by the same mechanism which performs the slot cutting operations to form the said slots 102 and 104.

The said carriage 12 is formed of iron construction and mostly of framing. A conventional radiator 114 and other appurtenances contiguous to an internal combustion engine are provided on the said carriage 12 such as the gasoline storage tank 116. Usual and conventional straps 118 may be used for rigidly associating the tank 116 with the carriage.

Substantially parallel top frame members 120 and 122, respectively, form a portion of the carriage and have various supports 124, 126, 128 and others, respectively, depending therefrom. These side members connect lower substantially parallel longitudinal frame members 130 and 132, respectively, in order to form a substantially rectangular body. This substantially rectangular body has a cantilever portion formed of rails or frame members 134 and 136, respectively. These last-mentioned members 134 and 136 are continuations of the upper frame members 122 and 124, respectively.

The said internal combustion engine 14 has a power shaft or crank shaft extending therefrom in the usual manner and a pulley 140 attached thereto. This pulley has a belt 142 extending therearound which also is entrained over another pulley 144. The last-mentioned pulley is rigidly attached to a main drive shaft 146 journalled in suitable bearings 148 and 150, respectively, mounted on the said framing element 120. Of course, as is seen in Figure 2 and in Figure 1, the said pulley 140 may be of the double type and also the pulley 144, thereby requiring two belts 142. This is a matter of expediency since there is a considerable amount of torque transferred from the crank shaft of the engine to the shaft 146.

Figure 1:
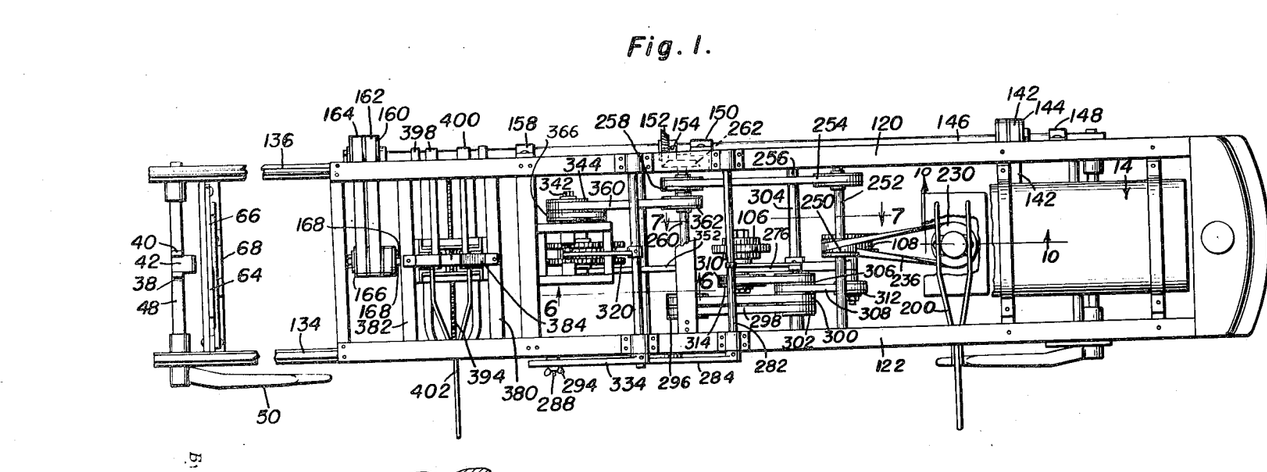
Figure 1 is a plan view of the preferred form of the invention.
Figure 2:
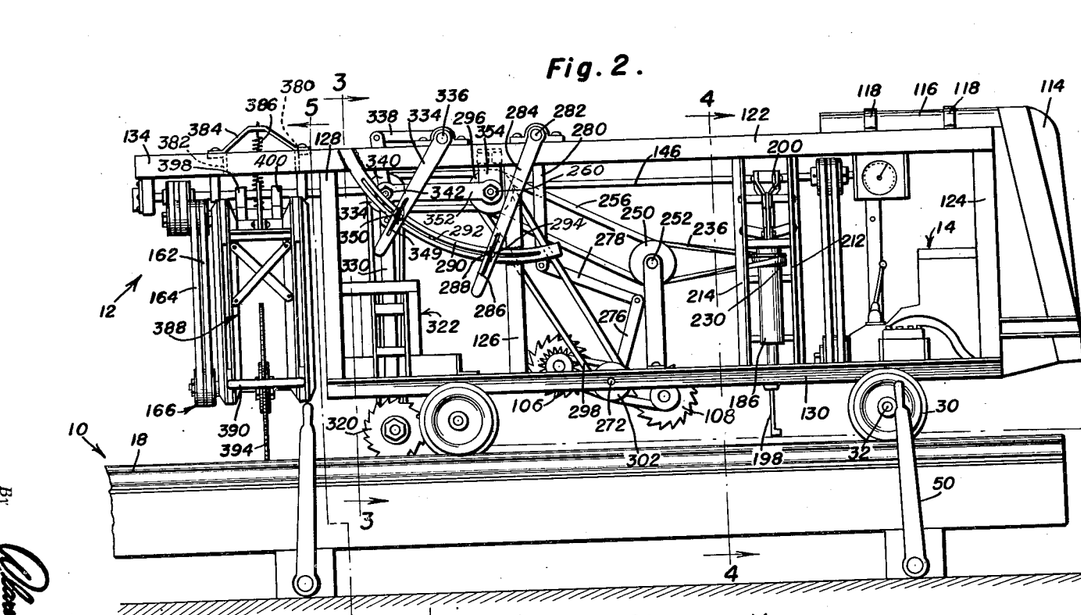
Figure 2 is an elevational side view of the invention shown in Figure 1.

In Figure 1 it is apparent that the said shaft 146 has a bevelled gear 152 attached thereto by means of a pin 154, set screw or the like. The said bevelled gear is utilized as a power take-off and will be described in detail later.

The said shaft 146 also continues past the bevelled gear 152 where it is additionally supported by means of hangers or bearings 158. Another double sheave or pulley 160 is attached adjacent the end of the shaft 146 and has belts 164 and 162 entrained therearound. These belts are also entrained around another double type sheave or pulley 166 which is attached to a shaft 168. From the shaft 146, which is a driven shaft (by the engine 14), all of the power requisite in the efficient operation of the cutters on the carriage 12 is supplied.

Figure 10:
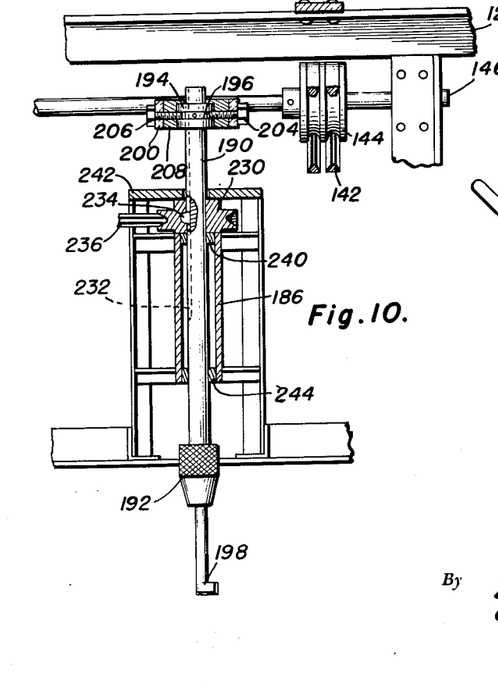
Figure 10 is a sectional view of the hole drilling or cutting means, taken on the line 10—10 of Figure 1.

Attention is now directed to Figures 2, 4 and 10, respectively, wherein the means for cutting holes in a log or other stock supported in the stand is provided and illustrated in detail. This means includes a truss-like frame member, generally indicated at 178 (Figure 4), having legs 180, 182, 184 and 186, respectively, attached thereto. The said last-mentioned legs are thermo-chemically or otherwise rigidly secured to a cylinder 186 which accommodates a reciprocating and rotating shaft 190. This shaft is obviously slidable in the bore of the cylinder 186. A conventional tool coupling 192 is secured at one end of the said shaft 190 while the other end carries a drum 194 having a groove 196 extending peripherally about the surface thereof. A typical cutter 198 is mounted in the tool holder 192 in order to cut both slots and holes in logs or other stock maintained in the stand 10.

Means for raising and lowering the shaft 190 is provided. This means may be seen best in Figure 4 as including a bifurcated lever 200 having aligned slots 202 in the furcations thereof. These slots accommodate a pair of pins 204 and 206, respectively, which extend from the collar 208. The said collar 208 is fitted on the drum 194 and the pins which are in the form of screws extend not only through the collar but terminate in the groove 196. Thus, since the bifurcated arm or lever 200 is pivoted by means of a pivot pin 210 through the carriage, raising and lowering one end of the bifurcated lever or arm will raise and lower the central shaft 190.

The specific mounting means for the bifurcated lever or arm 200 may be seen in Figure 2 as including a pair of uprights 212 and 214, respectively, extending from the top rail 122 and the bottom rail 130. For ease of actuation a pitman 216 is attached in one of several holes or apertures 218 in the end of the bifurcated arm 200 and in an aperture formed in the operating lever 220. This operating lever is of the first class, being attached at one end to the upright 214 and having the pitman 216 attached thereto at a point spaced from the first mentioned pivotal connection.

A pulley 230 is attached to the reciprocative shaft 190 through the medium of a slot 232 extending longitudinally of the shaft 190 and a pin 234 connection. The pin is slidably received in the slot 232 and is attached to the pulley 230. A belt 236 extends around the pulley 230 in order to impart torque to the said shaft 190. Thrust bearings 240 and 242 are secured, respectively, to the cylinder 186 and the upper portion of the small frame 178. This limits the travel of the pulley longitudinally of the shaft 190 to zero or substantially zero but allows rotative movement of the pulley 230. Thus, the pin 234 is stationary relative to movement axial of the shaft 190, thereby allowing only the shaft 190 to move axially, and in reality through the actuation of the handle 220 a reciprocatory movement may be effected. The said thrust bearing 240 acts as a bushing for the shaft 190, and another bushing 244 is supplied in the cylinder 186 spaced from the said thrust bearing 240.

The said belt 236 which imparts rotative movement to the shaft 190 extends around a pulley 250 which is attached to a counter-shaft 252. This counter-shaft has a sheave 254 attached thereto and a belt 256 extends therearound. This last-mentioned belt 256 is entrained around a pulley 258 which is secured on a shaft 260. This last-mentioned shaft is journalled across the frame members 120 and 122 in suitable bearings depending from one of the top cross members of the carriage. A bevelled gear 262 is attached to the said shaft 260 and is meshed with the bevelled gear 152. Thus, from the shaft 146 power is transmitted through the train of gears, belts, pulleys and shafts in the reverse order as described above. First the torque is taken from the main drive shaft 146, thence to the bevelled gear 262 and to the shaft 260. The torque is then carried from the pulley 258 on the shaft 260 through the belt 256, the pulley 254, the shaft 254 and, finally, to the belt 236 through the medium of the pulley 250.

Means for selectively cutting tongues and grooves longitudinally of the logs or other stock carried by the stand is provided. This means is mounted on the carriage and actuated by the internal combustion engine 14 through the medium of the shaft 146. In Figure 7 it will be seen that a rocker or rocker arm 270 has the said cutters 106 and 108 detachably secured to opposite ends thereof. The said cutter 106 has two relatively wide blades flanking a relatively smaller diameter blade in order that the material of the log will be cut away, leaving a tongue extending longitudinally thereof, when this blade is rendered operative.

The said blade 108 has a relatively large diameter blade flanked by two relatively small diameter blades in order that the material in the longitudinal center of the log or stock may be cut away, thereby leaving a slot longitudinally of the said log. The said rocker is journalled on a shaft 272 extending across the lower frame members 130 and 132, respectively. An actuating rod portion 274 projects at substantially right angles from the said rocker arm 270 and has a pitman 276 attached thereto. This pitman has a second pitman 278 attached at one end thereof which connects with an operating arm 280. This arm 280 is attached to a shaft 282 having a handle 284 at one end thereof. This handle 284 is slotted at 286, and a pin 288 extends through the said slot.

A smoothly curved or arcuate rod 290 is attached to the upright 126 and the top frame member 122 and has a slot 292 formed therein. This last-mentioned slot also carries the pin 288, and a fastening construction such as the wing nut 294 is supplied on the end of the pin 288. Thus, the operating handle 284 may be moved a selective amount, thereby rockingly actuating the rocker 270 and maintaining either of the cutters 106 or 108 in operative engagement with a log which is to be treated. When the selected cutter is adjusted the desired or required amount the wing nut construction 294 may be tightened, and this cutter is rendered stationarily operative.

Means for rendering the cutters operative is provided. The preferred means may be seen as a double sheave 296 provided on the said shaft 260 which is operatively associated with the shaft 146, as described above. The said double sheave 296 has a pair of belts 298 and 300 entrained therearound, which are also entrained around a second double sheave in this particular sub-system 302. The said double sheave 302 is journalled on a shaft 304 which extends across the carriage. Torque is derived from the shaft 260 through the pulley 296, thence through the belts 298 and 300. Of course, the torque is then carried through the double sheave or double pulley 302, thereby rendering the shaft 304 live. A double sheave 306 is attached to the shaft 304 and has a pair of belts 308 and 310 entrained therearound. These belts extend over pulleys 312 and 314, respectively, which are attached to shafts (unnumbered) carrying the said cutters 106 and 108. Of course, the said unnumbered shafts extend through the terminals of the rocker 270, in order to firmly support the cutters and shafts.

Figure 6:
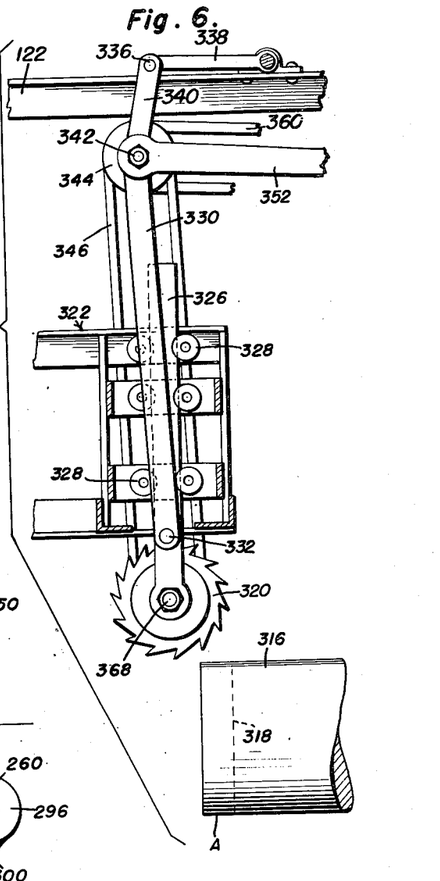
Figure 6 is a sectional detail of construction taken substantially on the line 6—6 of Figure 1 and in the direction of the arrows.

Means for treating the ends of logs such as cutting tongues or grooves therein is provided on the apparatus and may be seen best in Figures 6 and 2, respectively. A log 316 which has had a groove 318 cut therein is illustrated in Figure 6 adjacent the cutter blade 320.

A small frame, generally indicated at 322, is attached to the lower frame members 130 and 132 as well as a lower cross member 324. This sub-assembly frame has a piston 326 reciprocatively mounted therein and engaged by a plurality of rollers 328. These rollers are journalled on suitable truss members provided in the sub-assembly frame and forming a portion thereof. A pitman 330 is attached to the piston 326 by means of a pivot pin 332 and may be raised and lowered by means of a handle 334. This handle is journalled on a shaft 336 which is, in turn, mounted on the upper longitudinal carriage members 122 and 120, respectively. Conventional bearings may be used in this connection. A pitman 338 is rigidly attached to the shaft 336 and has a second pitman 340 attached at one end thereof. The said second pitman is secured to a cross shaft 342 which has a sheave 344 mounted thereon. This sheave has a belt 346 entrained therearound for a purpose to be described subsequently.

The said handle 334 has a slot 348 positioned therein and a pin 350 extending therethrough. This pin also extends into the said slot 294 in order to lock the raising and lowering piston 326 in a selected position. Thus, with the cutter 320 continually rotating, the entire carriage may simply be moved against a supported log in order to cut the groove at the end thereof or tongue by using another tool at a similar end of another log.

In order to guide the pitman 330 in its travel, a second pitman 352 is attached to the shaft 342 and also to a hanger 354 depending from the top members 122 and 120, respectively.

In order to render the cutter 320 operative, a belt 360 extends around a pulley 362 which is attached to the said shaft 260. Since this shaft 260 is live, as described above, torque is derived from the said shaft 146 and transmitted to the shaft 342 through the medium of the belt 360 and the other pulley 344 attached to the last-mentioned shaft. A second pulley 366 is also attached to the shaft 342, entraining the said belt 346 therearound and around another sheave (unshown), which is attached to a small shaft 368 carrying the said cutter 320. Thus, the said cutter 320 may be actuated, and is actuated, through the medium of the internal combustion engine 14.

Figure 5:
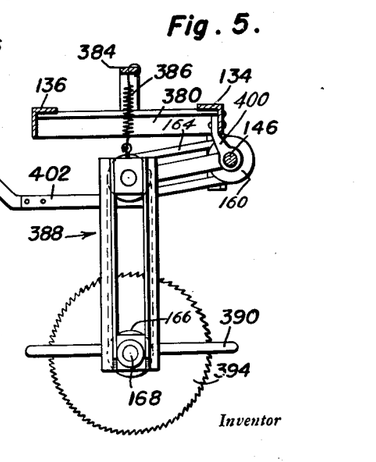
Figure 5 is a sectional view taken substantially on the line 5—5 of Figure 2 and in the direction of the arrows.

The final cutting operation on the logs takes place by a separate mechanism also driven by the shaft 146. This final cutting operation includes the trimming off or cutting to size the logs or other stock, preferably wooden, as desired by the operator of the invention and as dictated by the needs of the particular job. Attention is directed primarily to Figures 1, 2 and 5 for this structure. The cantilever portion formed by the extensions 134 and 136 have cross members 380 and 382 rigidly attached thereto. These cross members have a bridge 384 rigidly associated therewith, and this bridge has a spring 386 or other equivalent resilient biasing means attached thereto. The said spring extends through an aperture in the said bridge 384 in order to render it detachable.

Another framing sub-assembly is suspended by means of the spring 386 and is generally indicated at 388. This sub-assembly includes framing or truss members and has a guard 390 attached adjacent the lower portion thereof. The guard is in juxtaposition relative to a conventional circular saw blade 394, which blade is supported on a shaft 168. The said shaft 168 is journalled in the framing sub-assembly 388 and the said shaft 168 projects from the sub-assembly 388, supporting a double sheave 166 thereon, as described elsewhere in the description. The said belts 162 and 164 are entrained around this double sheave or pulley 166 in order to actuate the small shaft 168 and carry with it the saw blade 394. Of course, if it is found desirable, additional belts and pulleys may be supplied herein in order to direct the line of thrust from one shaft to another in what might be considered a more advantageous manner.

Means for raising and lowering the entire sub-assembly 388 and, therefore, the blade 394 is provided.

Hangers 400 are journalled on the shaft 146, and these hangers attach rigidly to the upper portion of the frame sub-assembly 388. A handle 402 is attached to the upper portion of the sub-assembly frame 388 in order to pivotally actuate the hangers about the shaft 146 as a center or axis. Thus, this entire sub-assembly 388 and the circular saw 394 may be selectively raised and lowered in order to cut off logs to preselected sizes.

The log is placed in the stand and adjusted to the selected, desired elevated position. Then, by manipulation of various levers, as described above, successive and some simultaneous operations may be performed on the logs. Holes may be cut therein, tongues cut, grooves cut, and other treating processes. The carriage is simply rolled back and forth, as desired, on the tracks or rails 18 and 20.

There is at all times a continuously operating shaft (while the engine is operative) transmitting torque to the various cutting elements and means. Thus, all of the cutters are operative simultaneously and one or two or more of the cutting means may be used to trim or otherwise treat logs or other stock.

It is apparent that certain variations may be made without departing from the spirit of the invention.

Having described the invention, what is claimed as new is:

1. In an apparatus for performing cutting operations on a log, a cutter, a frame assembly including a pair of side members and having means at one pair of ends thereof to support said cutter, a drive connection for said cutter in part lying parallel to the side members and connected to said cutter, a spring attached to said frame to yieldingly and resiliently support said frame and said cutter, and means connected to said frame for manually displacing said frames against the opposing yielding force of said spring.

2. In an apparatus for performing cutting operations on logs, a carriage, a main drive shaft located on said carriage, a cutter, a hanger pivotally disposed on said main drive shaft at one end of said hanger and connected at the other end thereof to a frame assembly, said frame assembly having means thereon mounting said cutter for rotation, a drive connection between said cutter and said shaft, and yielding means connected to said frame assembly for opposing the pivotal movement of said frame assembly about the longitudinal axis of said shaft in one direction.

3. The combination of claim 2 and said drive connection including a belt and pulley arrangement connected to said shaft and operatively connected with said cutter.

4. An apparatus for performing cutting operations on logs, comprising a movably mounted carriage, a prime mover mounted thereon, means mounted on said carriage and actuated by said prime mover for cutting a log at a preselected length, said last-mentioned means including a frame assembly, means at one end of said frame assembly for retaining a saw, a resilient element secured to the opposite end of said frame assembly and attached to said carriage for resiliently supporting said frame assembly, said frame assembly including a pair of guide members having a guard at the lower end thereof, and said resilient element being connected to a member located between the upper ends of said guide members.

GEORGE W. TIBBETS.

REFERENCES CITED

The following references are of record in the file of this patent:

UNITED STATES PATENTS

| Number | Name | Date |
|---|---|---|
| 71,998 | Dill | Dec. 10, 1867 |
| 366,017 | Moriarty | July 5, 1887 |
| 701,623 | Sandstrom | June 3, 1902 |
| 708,073 | Pollard et al. | Sept. 2, 1902 |
| 756,858 | Johnson | Apr. 12, 1904 |
| 1,133,902 | Wolf | Mar. 30, 1915 |
| 1,329,634 | Schumacher et al. | Feb. 3, 1920 |
| 1,699,582 | Breidenbach | Jan. 22, 1929 |
| 1,908,713 | McCarroll | May 16, 1933 |
| 1,910,326 | Ford | May 23, 1933 |
| 2,254,293 | Kaehlert | Sept. 2, 1941 |
| 2,320,056 | Swanger | May 25, 1943 |

FOREIGN PATENTS

| Number | Country | Date |
|---|---|---|
| 107,347 | Austria | Sept. 26, 1927 |
| 477,130 | Germany | June 1, 1929 |
| 113,782 | Sweden | Apr. 10, 1945 |